Aug. 31, 1954   C. L. NORTON, JR., ET AL   2,688,046
METHOD OF AND APPARATUS FOR MELTING REFRACTORY MATERIAL
Filed July 17, 1951   4 Sheets-Sheet 1

FIG. 1

Charles L. Norton, Jr.
Andrew B. Steever
INVENTORS

BY
J. P. Moran
ATTORNEY

Aug. 31, 1954    C. L. NORTON, JR., ET AL    2,688,046
METHOD OF AND APPARATUS FOR MELTING REFRACTORY MATERIAL
Filed July 17, 1951    4 Sheets-Sheet 2

Charles L. Norton, Jr.
Andrew B. Steever
INVENTORS

BY
J. P. Moran
ATTORNEY

Charles L. Norton, Jr.
Andrew B. Steever
INVENTORS

BY J.P. Moran
ATTORNEY

FIG. 8

Charles L. Norton, Jr.
Andrew B. Steever
INVENTORS

BY
J P Moran
ATTORNEY

Patented Aug. 31, 1954

2,688,046

UNITED STATES PATENT OFFICE 2,688,046

METHOD OF AND APPARATUS FOR MELTING REFRACTORY MATERIAL

Charles L. Norton, Jr., New York, N. Y., and Andrew B. Steever, Augusta, Ga., assignors to The Babcock & Wilcox Company, New York, N. Y., a corporation of New Jersey Application July 17, 1951, Serial No. 237,096

8 Claims. (Cl. 13—2)

This invention relates to an improved method of and apparatus for melting material having a relatively high melting point such as, for example, refractory materials of the type used in lining furnaces, crucibles, retorts, and the like operating at high temperatures.

Refractory materials used for this high temperature service have been found to be more volume constant and have better hot load strength (compressive strength at high temperatures) if the refractory material is melted and solidified into a crystalline structure than if it is sintered below its melting point according to usual practice. After solidification, the melted material is crushed to predetermined size to form a "grog" and may be subsequently processed by brick making machinery to form refractory blocks or shapes. The grog may also be used to form refractory mortars used in cementing the blocks or shapes in furnace structures, or to form plastic firebrick mixes or to form refractory castable compositions. The grog may also be used as an abrasive.

The preparation of such refractory materials involves consideration of the most economical heat source producing the requisite high temperature for melting the material. The importance of this will be clear when it is considered that refractory materials have melting points as high as 3400–3500° F., or higher. The higher melting point refractory materials can not be melted by fuel burning furnaces of the usual type, due to the difficulty in producing a sufficiently high furnace temperature to melt the materials. For these higher melting point refractories, it has been necessary in commercial processes to utilize highly expensive electric arc furnaces which will produce temperatures at the arc of 6000° F. or better. The high cost of melting with electric energy and resultant high sales price of the end products has greatly restricted the commercial use of those products.

Another consideration which must be taken into account is the problem of providing suitable furnace linings capable of withstanding such high temperatures during the melting of the refractory material. Such linings must not only be provided but must also be maintained during an appreciable period of time.

Another problem involved is that of utilizing a furnace lining which will not tend to contaminate the material being melted. If there is such contamination, the melt will not have constant physical properties. Purification or refinement of contaminated melt is difficult or impossible without re-melting thereof, which increases the cost of the end product.

While the foregoing considerations are applicable generally to all types of manufacture of melted refractories, they are particularly important in the production of fused mullite, which is a crystalline compound of alumina and silica with the formula $3Al_2O_3.2SiO_2$ and an excellent high temperature refractory. The quality of mullite refractories depends upon the amount, size and arrangement of the mullite crystals, and is substantially affected by the character of the other materials associated with the mullite.

Accordingly, while the invention is of general applicability in the production of fused refractories, it will be described more particularly as used in the production of mullite grog for mullite refractories such as described and claimed in the copending application of V. J. Duplin, Jr., and C. L. Norton, Jr., Serial No. 231,437 filed June 13, 1951.

As set forth in said copending application, the maximum amount of mullite is formed when the mixture has the theoretical mullite alumina-silica ratio of 72% alumina and 28% silica. The mullite crystals have their greatest freedom and rapidity of growth when the alumina-silica starting material is in a melted condition. As the heating temperature is increased above the mullite crystallization temperature and/or the heating time is increased while the mixture is at such a temperature, the size of the mullite crystals formed gradually increases until the crystals tend to abut and interlock with each other.

In the normal practice, high melting point refractories are melted in an electric arc furnace having electrodes immersed in the charge or melt. In such furnaces, difficulties are encountered, particularly in starting the melting, in maintaining stability of the arc.

In accordance with the present invention, the foregoing problems as to adequate and economic heating sources, production of the requisite high melting temperature, and provision and maintenance of a satisfactory lining in the melting furnace, are solved in a unique manner resulting in efficient production of high quality mullite or other refractories at a very substantial reduction in cost. The essential features of the invention contributing to these results are the preheating of the starting mixture in a fuel fired rotary kiln to a temperature approaching the melting point of the starting materials but less than that at which the materials will stick to the kiln surface. The starting materials are continuously fed, in a mechanically pre-mixed condition, through the fuel fired rotary kiln and are continuously discharged therefrom into an insulated storage bin or hopper. The thus heated starting materials remain at a relatively high temperature in the storage container, from which they are periodically discharged in batches into an electric arc melting furnace of a special type.

The electric arc melting furnace is of the so-called rocking furnace type comprising a cylindrical container having arcing carbon electrodes extending axially thereinto and preferably supported independently of the container. The container has a charging door and a discharge spout adjacent the door. The charging door is aligned with the outlet of the storage means to receive a batch or charge therefrom, which is then melted by the carbon arc while the furnace container is rocked to and fro through a predetermined arc. When molten, the charge from the furnace is discharged through the spout into a mold to form a refractory casting. This casting is then crushed to size to form the desired grog.

In accordance with the invention, it has been found that arc stability can be more easily controlled and more efficient melting is achieved when the material is melted by indirect arc heating, as distinguished from direct arc melting in which the electrodes are immersed or submerged into the material. To this end, each charge dumped into the furnace is of such an amount that its level will be below the axially extending arcing electrodes. The charge is thus heated by radiation from the arc, rather than by passage of the arcing current through the material.

The relatively high temperatures involved with a carbon arc furnace result in problems as to the provision and maintenance of a suitable lining on the furnace walls, a refractory lining being necessary because the arc temperature, and the temperatures developed by radiation from the arc, are substantially higher than the allowable use temperatures for the material of the container. Additionally, the refractory lining must be such as not to contaminate the charge being melted. This is solved in the present invention by lining the inner surface of the rocking furnace with coolant circulating elements, such elements extending throughout the axial length of the furnace and circumferentially thereof on all portions except the charging door and discharge spout.

Initially the coolant elements are covered to a pre-set depth with a burnt-in lining of the same material as that to be melted. While a charge of refractory material is being melted in the lined furnace, the container is rocked through an arc equal to 360° minus the arc segment occupied by the charging door and discharge spout. This causes the molten refractory of the same composition as that of the initial lining to flow over the lining. The lining builds up, as the cooling effect from the cooling elements through the intial lining solidifies some of the molten refractory, until a heat balance condition is attained. Should any portion of the lining be thinner or thicker than that corresponding to such heat balance condition, it will be built up or melted away until the equilibrium conditions again prevail.

A feature of the invention is the provision of a rocking cycle involving a predetermined pause of a pre-set length at each limit of the rocking motion. Such pause holds molten material over the lining at the two ends of the circumferential extent of the cooled surface for a sufficient time to build up the lining to the equilibrium thickness over such portions of the cooling elements. This is important as the two circumferential extremes of the cooled surface are, by virtue of the rocking cycle, exposed for a greater length of time to the radiant heat from the arc, being covered by molten refractory for only half the time the intermediate lining portion is covered, thus resulting in less rapid solidification of the molten lining over these extremes. As additional charges of the refractory material are melted in the furnace, the foregoing operating cycle effects a washing of the molten material over the previously formed lining resulting in a build up or replenishment of the lining particularly at worn or damaged areas.

The net result of this operation is the melting of the refractory in a self-replenishing lining having the same composition as the material being melted, thus resulting not only in providing a lining which is of at least as high a temperature resistant nature as the material being melted, but also of elimination of contamination of the melted charge by the materials of the lining. Any portion of the lining which is eroded and enters into the charge will, of course, have no effect on the purity of the charge as the lining and the charge have identical compositions.

It should be noted that such rocking furnaces normally are rocked through an arc of 180°, and can be turned through an additional 90° for charging or pouring. In the present invention, the rocking arc is substantially increased to a value approaching 360°, and, in addition, an appreciable pause is introduced at the limit of each direction of rocking motion for the reasons set forth above. In addition, the use of an indirect arc rather than a direct arc results in better control of the arc stability and greater melting efficiency.

For an understanding of the invention principles, reference is made to the following description of a typical embodiment of the invention method and apparatus as illustrated in the accompanying drawings.

Figure 1:
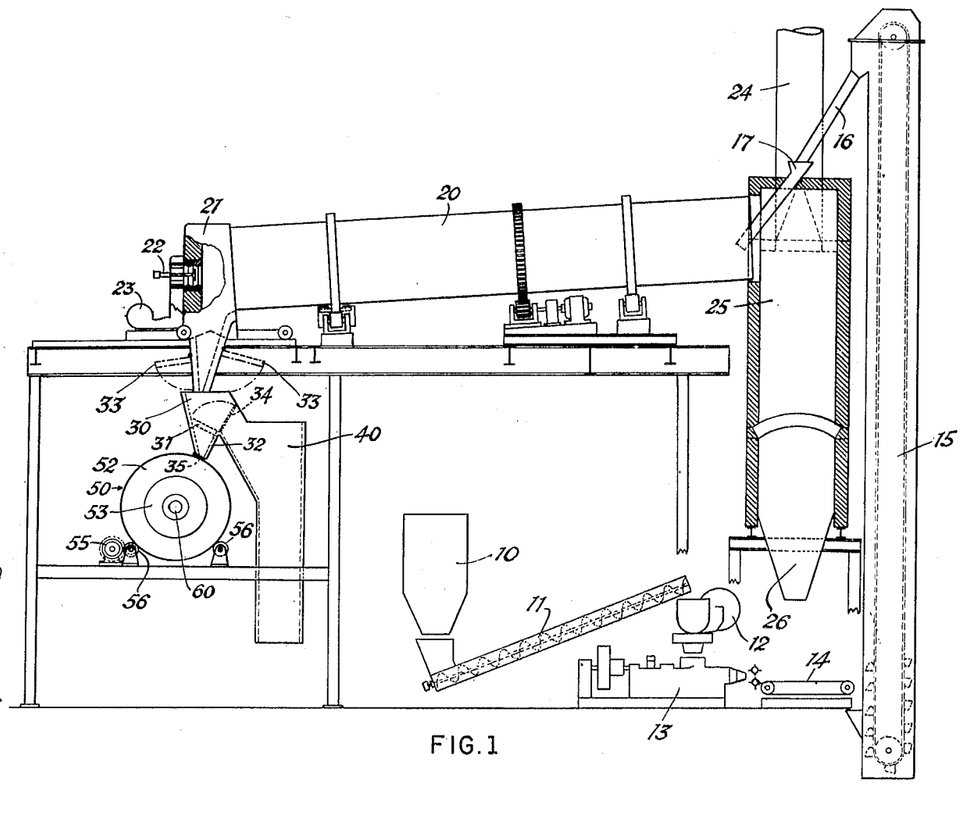
Fig. 1 is a somewhat schematic side elevation view of apparatus embodying the invention.
Figure 2:
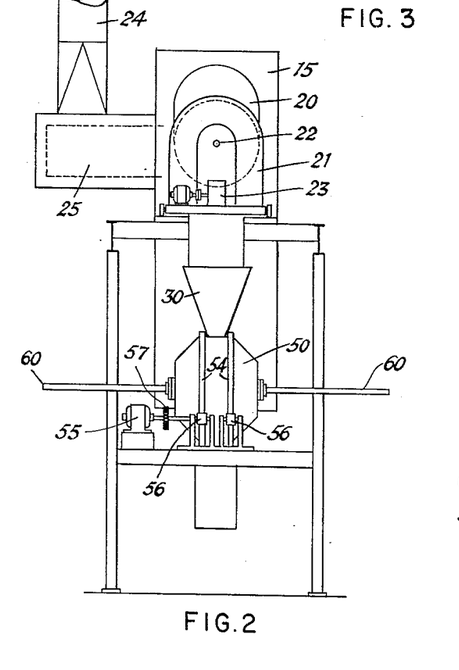
Fig. 2 is a left end elevation view, likewise somewhat diagrammatic, of the apparatus shown in Fig. 1.

Referring to Figs. 1 and 2, the apparatus shown therein will be described as used in the production of mullite from a starting mixture consisting of a blended mixture of kaolin and bauxite. A suitable bauxite is a raw high alumina bauxite, such as Dutch Guiana bauxite, which is mixed with pulverized raw kaolinic clay, such as Georgia or Florida kaolin, preferably in proportions providing a slight excess of alumina over the theoretical mullite composition in the final grog product. A representative raw Dutch Guiana bauxite would have the following approximate chemical analysis:

| | Per cent |
|---|---|
| $Al_2O_3$ | 61.26 |
| $SiO_2$ | 2.85 |
| $Fe_2O_3$ | 1.42 |
| $TiO_2$ | 2.55 |
| Ignition loss | 31.93 |
| $H_2O$ | 2.00 |

A representative raw Georgia kaolin would have the following approximate chemical analysis:

| | Per cent |
|---|---|
| $Al_2O_3$ | 38.5 |
| $SiO_2$ | 44.8 |
| $Fe_2O_3$ | 0.6 |
| $TiO_2$ | 1.8 |
| Ignition loss | 14.3 |

The raw bauxite and raw kaolin are preferably proportioned to produce grog having an alumina content of 73–77%, preferably 75%, by weight. Under these conditions, the silica content will be from 18–22%, preferably about 20%, by weight.

The starting materials are fed from a storage bin or bins 10 into a dry mix conveyor 11, which feeds the mixture to a mixer 12 where the dry mix has water added thereto to form a mixture which is discharged into an auger 13. The auger extrudes a column which may, for example, have cross sectional dimensions of 2" to 3" in each direction. This column is fed to a conveyor 14 where it is cut into cubes which are fed to an elevator 15. In order to condense the drawings, elements 10 through 13 are shown diagrammatically in Fig. 1, to the left of elevator 15, but, in a practical construction are located to the right or outside thereof.

From the upper end of elevator 15 the cubes are discharged into a discharge spout 16 leading to a spout 17 feeding a fuel fired rotary kiln 20 which slopes downwardly from its material entrance end to its material exit end. A stationary burner hood 21 at the material exit end of kiln 20 is provided with a fuel burner 22 for combustion of gas or oil in the presence of combustion air supplied by a blower 23.

The cubes are continuously fed to and through the kiln 20, being dropped along the inner surface thereof in intimate admixture with the high temperature products of combustion from the burner flowing through the kiln 20 to the exit of stack 24. A separating chamber arrangement, generally indicated at 25, is interposed in the gas flow path for recovery of any of the material being heated entrained in the gas stream. The recovered material may be periodically discharged for re-use from a hopper 26 at the lower end of the settling arrangement.

In flowing through the kiln 20, the starting material is heated to a relatively high temperature approaching its melting temperature but below the temperature at which the material would stick to the surface of the kiln. Preferably, in the production of mullite, the temperature of the material or mixture at the burner end of the kiln 20 will be of the order of 2800° F. When it is considered that mullite has a melting temperature of about 3290° F., it will be noted that a major portion of the required heat input for melting is provided to the material during passage through rotary kiln 20.

From the burner and kiln 20, the thus highly heated material is continuously discharged into a storage hopper 30 which is suitably insulated to hold the material at or near the temperature developed therein in kiln 20, and is lined with firebrick or other refractory 32. Control of the discharge material into hopper 30 is provided by a pair of hopper doors 33 which form a hopper spout, may be swung from the position shown in full lines, to a clean-out position, shown in broken lines. A swinging door 35 at the bottom of hopper 30 controls discharge of the heated material into the electric arc rocking furnace 50.

The hopper 30 is provided with a bar grate 31. A by-pass chute 40 is associated with the hopper so that, when the apparatus is used to produce material not requiring electric arc heating, the heated material discharged from kiln 20 may bypass the rocking electric arc furnace 50. Discharge of material selectively into hopper 30 or chute 40 is controlled by a door 34.

Batches of heated material, at a temperature of substantially 2800° F., are periodically discharged from hopper 30 into an electric arc rocking furnace 50. In furnace 50, the temperature of each batch of material is raised from approximately 2800° F. to 3400–3450° F. to melt the heated material and, as each batch is thoroughly melted, it is discharged from furnace 50 into suitable molds or the like to form solidified pigs of mullite. These pigs may then be broken up, in any suitable manner, to form the desired grog, e. g. a mullite grog of four (4) mesh plus fines.

The construction of electric arc furnace 50, and its manner of operation, are important features of the invention. In the particular embodiment shown, the furnace 50 comprises a casing of transverse circular cross-section having a central cylindrical portion 51 and frusto-conical ends 52, 52, closed by annular cover plates 53, 53. The central section carries a pair of circular tracks or runners 54 which support the casing on suitable rollers 56, 56 (Fig. 2). Rollers 56 are schematically indicated in Figs. 1 and 2 as driven by electric motor 55 through the medium of suitable gearing 57.

The container of furnace 50 is supported independently of its electrodes 60, 60 which extend through water cooled collar arrangements 61, 61 provided with coolant from conduits 62, 62. The electrodes extend axially into the furnace, and are preferably of carbon or other substantially non-consumable electrode material. The furnace construction, as so far described, is that of the standard rocking furnace such as the "Detroit" rocking furnace manufactured by Kuhlman Electric Company.

Figure 3:
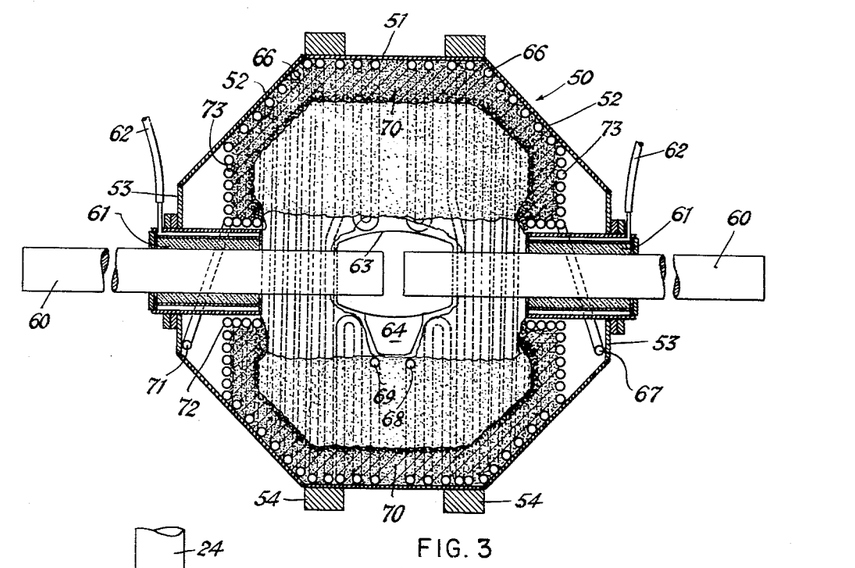
Fig. 3 is an axial sectional view through a rocking furnace constructed and operated in accordance with the invention principles, and taken on line 3—3 of Fig. 4.

The furnace container front has a charging door 63 circumferentially adjacent an opening which forms a discharge spout 64. The electrodes 60 are mounted on suitable independent supports (not shown) by means of which they may be advanced into and withdrawn from the rocking furnace and including, in accordance with the usual construction of such furnaces, suitable means for adjusting the arc spacing between the inner ends of the electrodes.

In accordances with the present invention, substantially all of the inner surface of container 51 and its ends 52, 52 is lined with pipes or conduits 66 arranged as two separate sections. The right hand section, as viewed in Fig. 3, receives coolant from an entrance connection 67 and discharges coolant from an end connection 68. The left hand section receives coolant from an entrance connection or admission port 69 and discharges coolant from an exit 71. It will be noted that both sections are so arranged that they cover the entire circumferential extent of container section 51 except for the arc occupied by door 63 and spout 64. Each section includes a cylindrically arranged coil such as 72 surrounding the innermost portion of a collar 61 and connected to the surface lining coils by platen coils 73.

During operation, the furnace container is rocked through an arc equal to 360° less than the arcuate extent of door 63 and spout 64, the arrangement being such that the door and spout are preferably maintained uppermost at each end of a rocking stroke. The control system, as will be presently described, is so arranged that there is a predetermined pause for a pre-set time interval at the end of each direction of rocking motion before the reverse motion is initiated.

The unlined furnace initially has the cooling conduits 66 covered with a lining of the material to be melted, this lining 70 having a predetermined depth. The charge of material in the furnace is of such amount that its surface remains somewhat below the electrodes. As the furnace is rocked, with electrodes 60 charged, the added material is melted by the radiant heat of the arcing electrodes and washes over the lining. The effect of the arc heat is greater on the exposed portions of lining 70 than on the portions covered by the melting refractory charge. Hence, the heat tends to melt material from the exposed lining, thinning these portions. At the same time, the lining covered by the melting charge is protected so that it tends to build up due to solidification of the melt by the coolant in conduits 66.

These effects occur cyclically as the furnace is rocked, with the previously thinned lining portions being built up as they are recovered by the melt, and the thickened portions being thinned as they are re-exposed. The build-up of the lining continues only until a state of equilibrium is reached wherein the lining thickness over the conduits is of such depth that the cooling effect of the conduits is insufficient to solidify further material heated by the radiation from the arc.

As those portions of the lining 70 which are at either limit of the rocking stroke are exposed for a longer time interval to the radiant heat of the arc, it is more difficult to build up and maintain a refractory lining thereover. The provision of the definite pause at each limit of rocking motion provides for the molten material to cover the extremes of the lining 70 for an extra length of time sufficient to build up and maintain the required depth of refractory lining over the end coils.

As each new batch of material is melted in the furnace, the reciprocating rocking cycle is continued so that the new material, becoming molten, washes over the previously deposited lining to build up worn spots and maintain the lining at the desired depth. Each batch of material is thus melted in contact with a self-replenishing lining having the same identical composition as the batch. Thereby, if any lining material is eroded and enters the batches, it is of no consequence insofar as purity and contamination of the batch are concerned.

Figure 4:
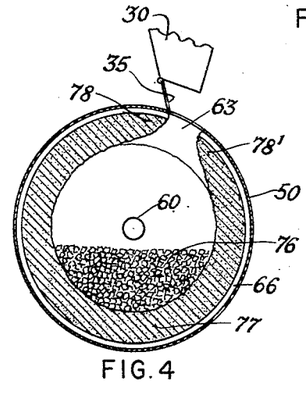
Fig. 4 is a diametric sectional view of the rocking furnace in the charging position, taken on the line 4—4 of Fig. 3.
Figure 5:
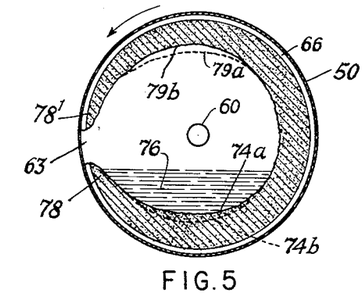
Figs. 5 and 6 are views similar to Fig. 4 illustrating conditions at each rocking limit.

The lining replenishing action is perhaps best illustrated by reference to Figs. 4, 5 and 6. Fig. 4 shows furnace 50 in position to receive a charge 76 from hopper 30 through charging door 63. It will be noted that the lining 70 is thicker in its intermediate portion 77 and thins toward either arcuate extremity as indicated at 78, 78'. As the furnace approaches one limit of rocking movement, as shown in Fig. 5, the lining portion covered by melt 76 tends to build up as indicated by the solid line 74a, the dotted line 74b indicating the lining depth before being covered by melt 76. The exposed lining portion is melted by the arc radiant heat, decreasing in thickness from the dotted line 79a to the solid line 79b.

Figure 6:
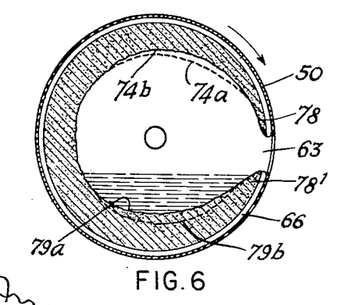

As the furnace rocks toward the other limit, the now covered lining portion is re-built from line 79b to line 79a, as shown in Fig. 6. Similarly, the exposed lining is melted, decreasing in thickness from line 74a to line 74b. The increased arc of rocking movement minimizes the heat loss to coils 66 and assures replenishment of lining 70 throughout its extent. The pause at each limit of rocking assures sufficient replenishment of the end portions of the lining, although these taper in thickness toward the limits of door 63 and spout 64.

Figure 7:
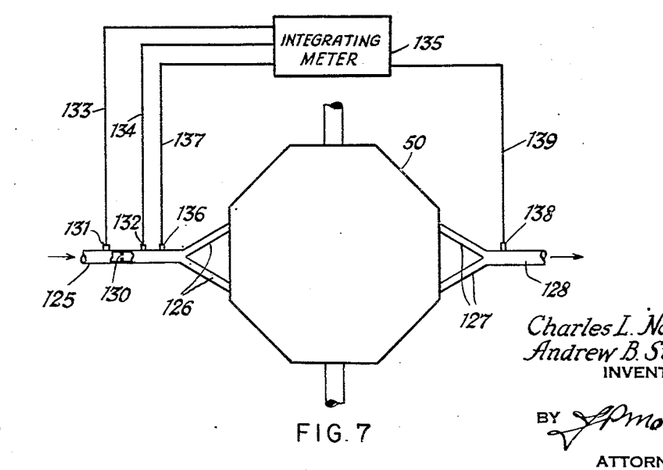
Fig. 7 is a somewhat schematic view illustrating a lining thickness detection arrangement for the rocking furnace.

Fig. 7 schematically indicates an arrangement for maintaining a checking observation on the average thickness of lining 70. With this arrangement, the operator of the apparatus can observe when the thickness departs from optimum and correct such factors as the size of charge 76 and the rate of coolant flow through conduits 66 to restore the lining thickness to the optimum value.

The coolant entering conduits 66 is delivered through a main 125 to branches 126, 126 each leading to one cooling coil section. The exit ends of the sections are connected through branches 127, 127, to a return main 128.

The rate of in-flow through main 125 is measured by an orifice plate 130 associated with upstream and downstream pitot tube connections 131, 132, the two pressure measurements being applied through lines 133, 134 to a meter 135. A temperature indicator 136, mounted in main 125, has its measurement transmitted to meter 135 through line 137. The temperature of coolant leaving furnace 50 is measured by an indicator 138 connected to meter 135 by a line 139.

Meter 135 thus receives measurements of the rate of coolant flow through conduits 66, the entering temperature of the coolant, and the temperature of the discharged coolant. The meter is an integrating meter, such as the "Heat Meter" manufactured by Bailey Meter Co., and its reading is an integration of the three variables. Should lining 70 decrease in thickness, the coolant discharge temperature will rise, correspondingly changing the reading of meter 135. The operator can either increase the coolant flow rate, or increase the size of charge 76, or both, to restore the lining to opposite thickness. The reverse is true when the lining becomes thicker than optimum to decrease the coolant discharge temperature.

In a specific example, furnace 50 will melt approximately one (1) ton of mullite per hour and each batch requires from 12 to 18 minutes in the furnace 50 to become molten. As each batch becomes molten it is discharged through spout 64 into molds for forming refractory pigs.

With the described arrangement, the electric furnace need raise the temperature of the material only from approximately 2800° F. to about 3400–3450° F., thereby substantially reducing the required electrical energy input as compared with that required if the material were charged cold into furnace 50. The major portion of the heat input is provided by the rotary kiln 20 utilizing a much less expensive source of heat.

Figure 8:
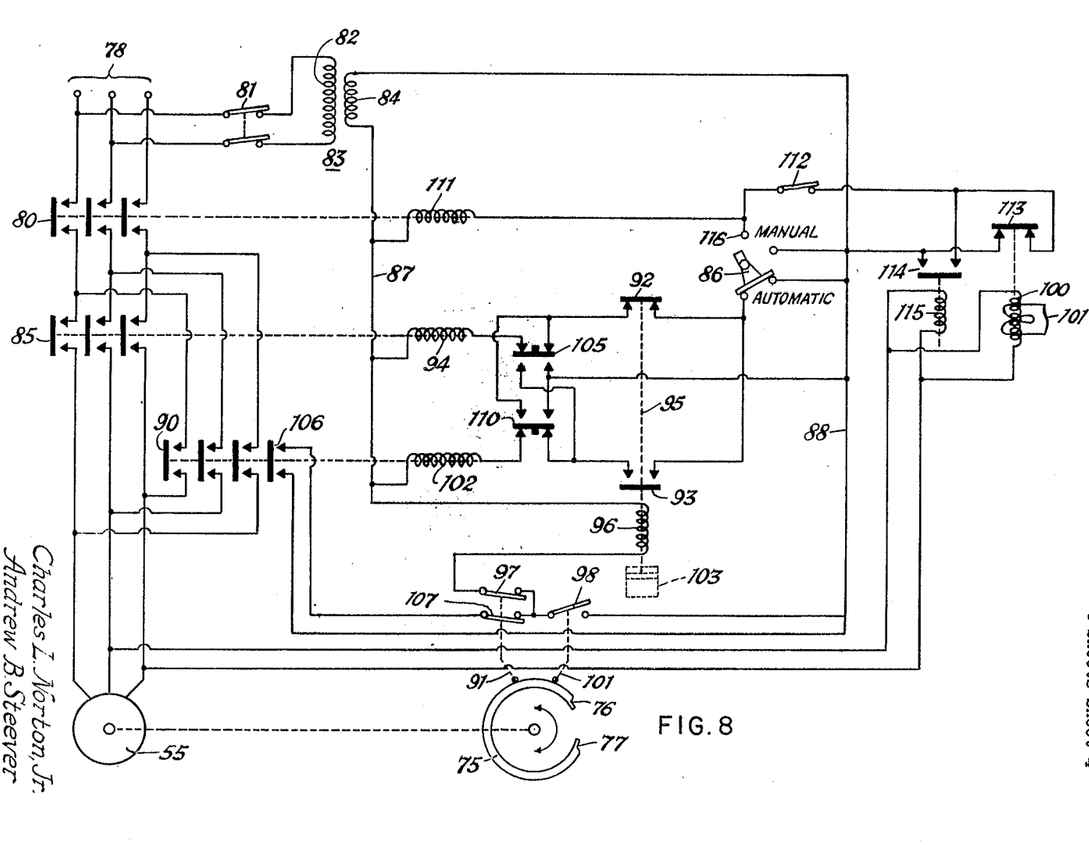
Fig. 8 is a schematic wiring diagram of a control system for effecting operation of the rocking furnace in accordance with the principles of the invention.

Fig. 8 illustrates a typical control arrangement for the furnace 50. Control of the rocking cycle is provided by a cam 75 in the form of a ring fitted around the cylindrical portion 51 of the furnace container and having cam portions 76, 77 at either end. The gap or spacing between cam portions 76, 77 is substantially equal to the arcuate length occupied by door 63 and spout 64. The motor 55 is a three-phase A. C. motor supplied from a polyphase source 78 through a safety contactor 80, "forward" and "reverse" contactors 85 and 90 being provided to control the direction of operation of motor 55. Control energy is provided from one phase of the source through an emergency switch 81 to the primary winding 82 of a step-down transformer 83 having a secondary winding 84. Secondary winding 84 provides control potential to mains 87 and 88.

Selection of automatic or manual control is made by a switch 86 which is shown in the "automatic" position. The automatic rocking motion is under control of a contactor 95 having an operating coil 96 with one terminal connected directly to main 87 and the other terminal connected to main 88 in series with a normally closed reverse limit switch 97 and a normally open forward limit switch 98. In the position shown in the drawing, switch 98 has been opened by counter-clockwise rotation of cam 75 to raise the operator 101 of the switch so that the circuit for coil 96 is broken, whereby the contacts 92 of contactor 95 are closed and contacts 93 are opened. This energizes coil 94 of "forward" contactor 85, safety contactor 80 having previously closed in a manner described hereinafter.

The motor 55 continues its operation to rotate cam 75 counter-clockwise until the operator 101 of switch 98 rides onto the cam portion 76. This closes switch 98, completing a circuit for energizing control contactor 95. As control contactor 95 has its coil energized, its contacts 92 are opened and contacts 93 are closed to energize the operating coil 102 of the "reverse" contactor 90. This reversal is effected after a predetermined time interval provided by the control action of a dash-pot 103 connected to contactor 95, and also controlled by a time delay relay 100 which may either be a relay provided with a dash-pot or one having a short circuiting heavy copper coil 104 as indicated.

Cam 75 and the container of furnace 50 are now rotated in a clockwise direction until such time as operator 91 drops upon engagement with cam section 77. This breaks the circuit for coil 96 which action, after a predetermined time interval, recloses contacts 92 and reopens contacts 93 to reverse the direction of motor 55. The reverse directions of operation of motor 55 may also be manually controlled, as during charging or pouring, by turning switch 86 to the manual position and using a "reverse" push-button 105 and a "forward" push-button 110 which shunt the respective contacts 93 and 92 of contactor 95 and are so arranged that operation of either push-button breaks the control circuit of the other push-button.

Coil 96 is also connected to main 88 through a second contact 107 associated with switch 97 and hold-in contacts 106 associated with "reverse" contactor 90 so that coil 96, when energized, will remain energized, irrespective of opening of switch 98, until such time as a further control action takes place.

Such further control action is provided by the safety contactor 80 which has an operating coil 111 connected at one end to main 87 and, at the other end, to one of the manual contacts 116 of switch 86 and in parallel therewith through a normally closed over-travel switch 112 and the normally closed contacts 113 of time delay relay 100 to main 88. The normally open contacts 114 of a hold-in relay 15 shunt the contacts 113 of time delay relay 100.

As the motor circuit is broken at either limit of rocking motion, by operation of one of the contactors 85 or 90, the hold-in relay 115 immediately opens, breaking the circuit for coil 111 of safety contactor 80, which latter thereupon opens. After a pre-set time delay, the now de-energized time delay relay 100 closes contacts 113 to again energize coil 111 and close contactor 80. This starts rotation of the motor in the opposite direction, and relays 100 and 115 are again energized to respectively close contacts 114 and open contacts 113. It should be noted that, as the clockwise rotation of cam 75 begins, switch 98 is immediately reopened. However, coil 96 is maintained energized through the auxiliary contacts 107 and hold-in contacts 106 associated with "reverse" contactor 90. Should the limiting controls fail to operate, suitable mechanical means on the furnace container immediately open over-travel switch 112 to open contactor 80.

While specific embodiments of the invention have been shown and described in detail to illustrate the application of the invention principles, it will be understood that the invention may be otherwise embodied without departing from such principles.

We claim:

1. The method of melting a refractory material which comprises charging a batch of said material into a substantially cylindrical rocking furnace having arcing electrodes extending thereinto, a charging opening, a discharge spout circumferentially closely adjacent the charging opening, and an inner lining of the material to be melted; cooling the inner surface of the furnace, to a temperature substantially below the solidification temperature of said material, throughout its axial length and through an arc including the circumference of the furnace less the arc including the charging opening and pour spout; melting added refractory material by heat from the arcing electrodes while rocking the furnace about its axis through an arc of the order of the circumferential extent of the cooled inner surface to solidify material on the initial lining to maintain a refractory lining on such surface portion; and then periodically recharging the furnace with batches of said material through the charging opening, melting each such additional batch in contact with said refractory lining while so rocking the furnace, and periodically discharging each melted batch of material through the discharge spout, all in a repetitive cycle.

2. The method of melting a refractory material which comprises charging a batch of said material into a substantially cylindrical rocking furnace having arcing electrodes extending thereinto, a charging opening, a discharge spout circumferentially closely adjacent the charging opening, and an inner lining of the material to be melted; cooling the inner surface of the furnace, to a temperature substantially below the solidification temperature of said material, throughout its axial length and through an arc including the circumference of the furnace less the arc including the charging opening and pour spout; melting added refractory material by heat from the arcing electrodes while rocking the furnace about its axis through an arc of the order of the circumferential extent of the cooled inner surface to solidify material on the initial lining to maintain a refractory lining on such surface portion; holding the furnace stationary, for a pre-set time, at the end of the rocking stroke in each direction to provide for the molten material to be cooled and set at each end of the arcuate extent of the initial lining; and then periodically recharging the thus lined furnace with batches of said material through the charging opening, melting each such additional batch in contact with said refractory lining while so rocking the furnace, and periodically discharging each melted batch of material through the discharge spout, all in a repetitive cycle.

3. The method of melting a refractory material which comprises charging a batch of said material into a substantially cylindrical rocking furnace having arcing electrodes extending substantially axially thereinto, a charging opening, a discharge spout circumferentially closely adjacent the charging opening, and an initial inner lining of the material to be melted; cooling the inner surface of the furnace, to a temperature substantially below the solidification temperature of said material, throughout its axial length and through an arc including the circumference of the furnace less the arc including the charging opening and pour spout; melting added refractory material by radiant heat from the arcing electrodes while rocking the furnace about its axis through an arc equal to the circumferential extent of the cooled inner surface to solidify material on the initial lining to maintain a refractory lining on such surface portion; and then periodically recharging the thus lined furnace with additional batches of said material through the charging opening, melting each such additional batch in contact with said refractory lining while so rocking the furnace and periodically discharging each melted batch of material through the discharge spout, all in a repetitive cycle.

4. The method of melting a refractory material which comprises charging a batch of said material into a substantially cylindrical rocking furnace having arcing electrodes extending substantially axially thereinto, a charging opening, a discharge spout circumferentially closely adjacent the charging opening, and an initial inner lining of the material to be melted; cooling the inner surface of the furnace, to a temperature substantially below the solidification temperature of said material, throughout its axial length and through an arc including the circumference of the furnace less the arc including the charging opening and pour spout; melting added refractory material by radiant heat from the arcing electrodes while rocking the furnace about its axis through an arc of the order of the circumferential extent of the cooled inner surface to solidify material on the initial lining to maintain a refractory lining on such surface portion; holding the furnace stationary, for a pre-set time, at the end of the rocking stroke in each direction to provide for the molten material to be cooled and set at each end of the arcuate extent of the initial lining; and then periodically recharging the thus lined furnace with similar sized batches of said material through the charging opening, melting each such additional batch in contact with said refractory lining while so rocking the furnace and periodically discharging each melted batch of material through the discharge spout, all in a repetitive cycle.

5. Apparatus for melting a refractory material comprising, in combination, an elongated heating chamber inclined at a small angle to the horizontal; low cost fuel burning means arranged to direct high temperature gaseous products of combustion through said chamber from the lower end thereof; means operable to continuously feed the refractory material into the end of said chamber remote from said burner means for passage through said chamber in intimate mixing relation with such high temperature products of combustion to elevate the temperature of such material; storage means arranged to continuously receive the thus heated material from the opposite end of said chamber; a horizontal electric arc rocking furnace adjacent said storage means and having a charging opening alignable with the latter; means operable periodically to discharge a batch of the thus heated material from said storage means into said furnace for melting by the heat of the electric arc therein; means operable to rock said furnace about its axis during melting of the material therein; and means operable periodically to discharge the molten material from said furnace.

6. Apparatus for melting a refractory material comprising, in combination, an inclined elongated rotary kiln; low cost fuel burning means arranged to direct high temperature gaseous products of combustion through said kiln from the discharge end thereof; means operable to continuously feed the refractory material into the end of said kiln remote from said burner means for passage through said kiln in intimate mixing relation with such high temperature products of combustion to elevate the temperature of such material to a value approaching its melting temperature but below its sticking temperature; storage means arranged to continuously receive the thus heated material from the discharge end of said kiln; a horizontal electric arc rocking furnace adjacent said storage means and having a charging opening alignable with the latter; means operable periodically to discharge a batch of the thus heated material from said storage means into said furnace for melting by the heat of the electric arc therein; means operable to rock said furnace about its axis during melting of the material therein; and means operable periodically to discharge the molten material from said furnace.

7. Apparatus for melting a refractory material comprising, in combination, an inclined elongated rotary kiln; low cost fuel burning means arranged to direct high temperature gaseous products of combustion through said kiln from the discharge end thereof; means operable to continuously feed the refractory material into the end of said kiln remote from said burner means for passage through said kiln in intimate mixing relation with such high temperature products of combustion to elevate the temperature of such material to a value approaching its melting temperature but below its sticking temperature; storage means arranged to continuously receive the heated material from the discharge end of said kiln; a cylindrical furnace having arcing electrodes extending substantially axially thereinto, a charging opening alignable with said storage means, and a discharge spout circumferentially closely adjacent the charging opening; cooling means arranged on the inner surface of said furnace throughout its axial length and through an arc including the circumference of the furnace less the arc including the charging opening and pour spout; an initial lining of the material to be melted covering said cooling means; means for circulating a cooling medium through said cooling means to maintain the temperature of the latter at a value below the solidification temperature of the refractory material; means for rocking the furnace about it axis through an arc of the order of the circumferential extent of the cooled inner surface; means operable periodically to discharge a batch of heated material from said storage means into said furnace through said charging opening for melting by the heat of the electric arc therein, the molten material in contact with said initial lining solidifying thereon to maintain a refractory lining covering said cooling means; and means operable periodically to discharge the molten material from said furnace through said discharge spout.

8. Apparatus for melting a refractory material comprising, in combination, an inclined elongated rotary kiln; fuel burner means arranged to direct high temperature gaseous products of combustion through said kiln from the discharge end thereof; means operable to continuously feed the refractory material into the end of said kiln remote from said burner means for passage through said kiln in intimate mixing relation with such high temperature products of combustion to elevate the temperature of such material to a value approaching its melting temperature but below its sticking temperature; storage means arranged to continuously receive the heated material from the discharge end of said kiln; a cylindrical furnace having arcing electrodes extending substantially axially thereinto, a charging opening alignable with said storage means, and a discharge spout circumferentially closely adjacent the charging opening; cooling means arranged on the inner surface of said furnace throughout its axial length and through an arc including the circumference of the furnace less the arc including the charging opening and pour spout; an initial lining of the material to be melted covering said cooling means; means for circulating a cooling medium through said cooling means to maintain the temperature of the latter at a value below the solidification temperature of the refractory material; means for rocking the furnace about its axis through an arc of the order of the circumferential extent of the cooled inner surface; means operable periodically to discharge a batch of heated material from said storage means into said furnace through said charging opening for melting by the heat of the electric arc therein, the molten material in contact with said initial lining solidifying to maintain a refractory lining covering said cooling means; the amount of said discharged heated material being sufficient to fill the furnace only to a level below the electrodes; means operable to hold the furnace stationary for a pre-set time interval at the end of the rocking stroke in each direction; and means operable periodically to discharge the molten material from said furnace through said discharge spout.

References Cited in the file of this patent

UNITED STATES PATENTS

| Number | Name | Date |
|---|---|---|
| 826,744 | Price | July 24, 1906 |
| 986,741 | Morrison, et al. | Mar. 14, 1911 |
| 1,009,559 | Peacock | Nov. 21, 1911 |
| 1,034,747 | Weeks | Aug. 6, 1912 |
| 1,857,103 | South | May 3, 1932 |
| 1,904,664 | Neuhass | Apr. 18, 1933 |
| 2,175,291 | Heskett | Oct. 10, 1939 |
| 2,310,635 | Hopkins | Feb. 9, 1943 |
| 2,351,677 | Gygi | June 20, 1944 |
| 2,358,903 | Zotos | Sept. 26, 1944 |
| 2,430,171 | Hatch | Nov. 4, 1947 |
| 2,514,871 | Jordan | July 11, 1950 |